United States Patent
Swart

[19]

[11] Patent Number: 5,924,560
[45] Date of Patent: Jul. 20, 1999

[54] PACKAGE FOR FLOWERS

[75] Inventor: Annelies Swart, Groningen, Netherlands

[73] Assignee: De Veer, GIJS, WS Amsterdam, Netherlands

[21] Appl. No.: 08/836,900

[22] PCT Filed: Aug. 15, 1995

[86] PCT No.: PCT/NL95/00272

§ 371 Date: Jun. 4, 1997

§ 102(e) Date: Jun. 4, 1997

[87] PCT Pub. No.: WO96/12662

PCT Pub. Date: May 2, 1996

[30] Foreign Application Priority Data

Oct. 25, 1994 [EP] European Pat. Off. .............. 94203100

[51] Int. Cl.$^6$ .............................. B65D 85/52; B65D 85/60
[52] U.S. Cl. ........................... 206/45.24; 47/84; 206/423; 220/669; 229/4.5; 426/122
[58] Field of Search .............................. 47/41.01, 73, 84; 206/45.2, 45.24, 45.26, 423, 756, 822; 220/669; 229/87.08, 4.5, 101, 101.1, 400, 404, 904.1; 383/1, 107; 426/122, 130

[56] References Cited

U.S. PATENT DOCUMENTS

| | | | |
|---|---|---|---|
| 1,270,554 | 6/1918 | Rubel | 206/423 |
| 1,599,267 | 9/1926 | Amos | 229/87.08 |
| 1,714,121 | 5/1929 | Barbieri | 229/4.5 |
| 3,767,104 | 10/1973 | Bachmnan et al. | 206/423 |
| 3,797,690 | 3/1974 | Taylor et al. | 383/1 |
| 3,903,029 | 9/1975 | Young | 383/1 |
| 4,863,015 | 9/1989 | Toltzman | 206/756 |
| 4,946,290 | 8/1990 | Matyja | 206/423 |
| 5,108,807 | 4/1992 | Tucker | 383/1 |
| 5,409,315 | 4/1995 | Evans | 383/1 |

FOREIGN PATENT DOCUMENTS

| | | |
|---|---|---|
| A 2 073 247 | 10/1971 | France . |
| A 2 674 420 | 10/1992 | France . |
| A 297 654 | 5/1916 | Germany . |
| A 11 66 692 | 3/1964 | Germany . |

*Primary Examiner*—Jim Foster
*Attorney, Agent, or Firm*—Darby&Darby

[57] ABSTRACT

The object of this invention is to provide a package for flowers, candy or other consumables or objects which can easily be transformed from a first, transport configuration into a second, stationary configuration, is stable in its stationary configuration and can be manufactured exclusively out of thin walled material such as (biodegradable) plastic board or fiber board. Transformation from the transport configuration into the stationary configuration can easily be accomplished by detaching the upper part from the lower part along a weakened line delimitating the upper and the lower part when the package is in transport condition. Then the lower part is inserted into the upper part, which preferably has to be inverted first so that the generally relatively wide upper end of the upper part faces downward and forms the new lower end until the lower part is supported by the lower end of the upper part.

17 Claims, 1 Drawing Sheet

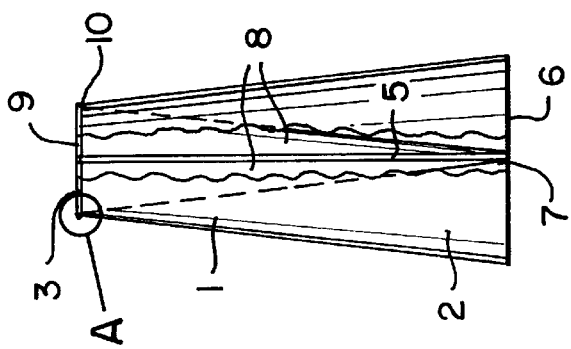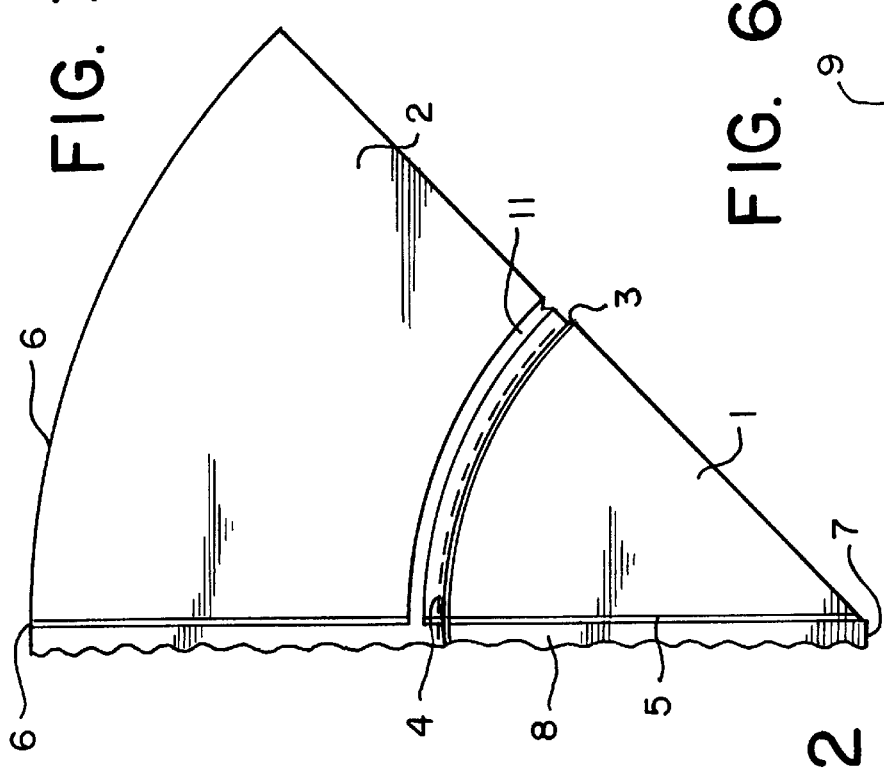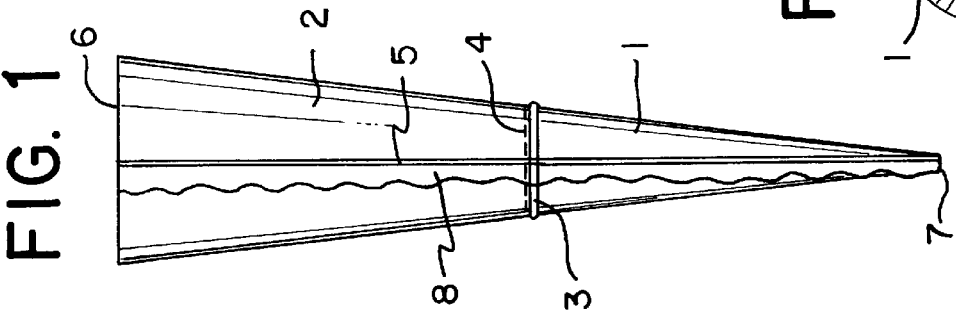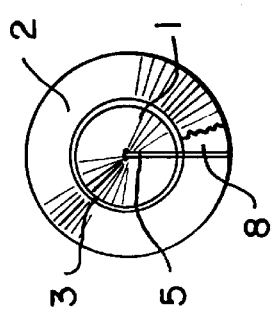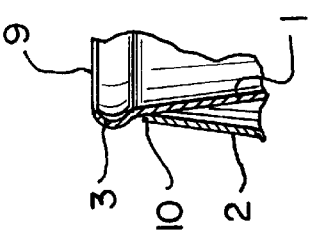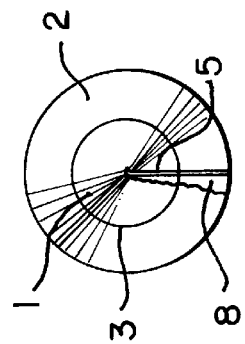

PACKAGE FOR FLOWERS

The invention relates to a package for flowers, candy or other consumables or objects according to the preamble of claim 1.

Such a package for flowers is known from FR-A-2 073 247. This citation teaches a package for carrying one single flower, which package has a lower part which is acute angled and a spherical upper part. The package can be transformed into a stationary configuration by inverting the upper spherical part, and then placing the lower part on top thereof. This is, however, rather bothersome due to the fact that according to this citation, the lower part requires inversion and truncation prior to placing same on the spherical part. In view thereof, separate handling of the flower is also required.

Other known packages that are used for flowers, are set forth below. EP 0 240 628 for instance teaches a package for flowers which, in a first configuration, can be used essentially as a conventional package for use when transporting flowers. The package can be transformed into a second, stationary configuration in which it forms a free-standing vase.

A problem of this known package is, that it is relatively cumbersome to transform it from the first, transport configuration into the second, stationary configuration, because this involves folding in and out several leg portions.

Another problem of this known package is, that it is relatively unstable in stationary configuration unless very rigid material is used, because the support legs are of flat material. However the use of rigid material makes transforming the package into the stationary configuration even more cumbersome.

A third problem of this known package is, that it comprises an inflexible bottom insert, which increases the cost of the package and the space occupied by a multiple of the packages before use.

U.S. Pat. No. 1,270,554 (Rubel) discloses a combination shipping box and vase which includes generally two portions, pinned together and separable for recombination as a vase. The apparatus comprises two separate portions, a top portion and a bottom portion, both of which are tapered. The two portions are secured by a pair of screws or pins. With the pins or screws removed, the top portion is removed from the bottom portion, and the bottom portion is then inserted into the top portion in an inverted manner. The top portion then becomes a bottom or stand for the apparatus, and the apparatus can then be used as a vase.

A problem of this known package is that conversion from the first into the second configuration is rather cumbersome due to the required application of screws or pins for securing the connection of the lower and upper parts in the first configuration.

It is an object of the present invention, to provide a package for flowers, candy or other consumables which can be brought from a first configuration into a second configuration more easily, which is more stable in its second, stationary configuration and which can be manufactured exclusively out of thin walled material, such as (biodegradable) plastic board or fibre board.

According to the invention, this object is achieved by providing a package of the type defined in the opening paragraph with the characterizing features of claim 1.

The package can for example be manufactured out of a single or two-part blank.

In the first configuration the package is dimensioned so as to be able to laterally enclose a complete bunch of flowers in order that the flowers are protected from being damaged.

Transformation of the package from the first configuration into the second configuration can easily be accomplished by detaching the upper part from the lower part, for example along a weakened line delimiting the upper and the lower part when the package is in the first configuration. Then the upper part has to be inverted so that the generally relatively wide upper end of the upper part in the first configuration faces downward and forms the lower end in the second, stationary position. Thereafter the lower part is inserted into the upper part until the lower part is supported by the upper end of the upper part.

In the second, stationary configuration, the upper part provides a stable support for the lower part immediately adjacent to the upper end of the lower part, allowing the package to be used as a vase for relatively large bundles of flowers with little risk of falling over.

The upper part may be provided with a cover in the first configuration, which cover may be used as a base-plate in the second, stationary configuration to further improve the stability thereof.

Particular embodiments of the invention are set out in the dependent claims.

Hereinafter, embodiments of the invention are described in detail with reference to the drawings in which:

FIG. 1 is a frontal view of the package according to the invention in the first configuration.

FIG. 2 is a top view of a package according to the invention in the first configuration.

FIG. 3 is a plan view illustrating the blank from which the package according to the invention is formed.

FIG. 4 shows a frontal view of the package according to the invention in the second position.

FIG. 5 shows a top view of the package according to the invention in the second position.

FIG. 6 shows a cross-section of detail A in FIG. 5 of the package according to the invention.

The package in the first configuration shown in FIG. 1 is conically tapered along straight lines from top 6 to bottom 7; in this configuration the package is for instance usable for transportation of flowers.

Aforementioned package comprises a lower part 1 and an upper part 2; in the first configuration these two parts are detachably connected to each other.

The lower part 1 has one radial outward projection 3 extending around the circumference of its upper end; at its lower end 7 the lower part 1 is substantially acutely angled. Above said projection 3 a detachable oscillating patterned line 4 is provided, so that along said line 4 the lower part 1 is detachable from the upper part 2.

Referring now to FIG. 3 it is demonstrated that the package according to the invention may be manufactured out of one single or two-part thin walled material such as (biodegradable) plastic board or fibre board. The plastic or fibre board is provided with a weakened line 4, a radial outward projection 3 on the lower part 1, and a radial inward projection 11 on the upper part 2.

The blank will be formed into a conically tapered object by folding and subsequent welding along straight line 5 extending from the upper end 6 of the upper part 2 to the lower end 7 of the lower part 1 of the package. When the package is used for flowers, it is essential that the welded line 5 provides a water-tight sealing.

Due to the conically tapered form along straight lines from top to bottom, a multitude of packages in their first configuration can be stacked, whereby the outward projection rules out the possibility of an arising vacuum, which would otherwise prevent the loosening of single packages from the stock.

The use of the package according to the invention will be explained hereinafter in relation to its use for flowers.

For transport a bunch of flowers may be put into the package in the first configuration according to FIG. 1.

The lower part 1 of the package is water-tight, in order to allow the flowers to benefit from water during transportation. The package according to the invention not only protects the flowers from being damaged but also from dehydration thus giving the flowers a surplus value.

For assembling the second, stationary configuration, the package of the first configuration is divided in two parts, the lower part 1 and the upper part 2; the division taking place along the oscillating patterned line 4.

The lower part 1 has an open upper end 9 and a welded lower end 7. The lower part 1 is water-tight and has a radial outward projection 3 at its upper end 9.

The upper part 2 has a cross-section at its upper end 6 larger than the cross-section of its lower end 10.

In the second, stationary configuration the upper part 2 is inverted so that the upper end 6 of the upper part 2 faces downward and forms then the lower end in the second configuration of the package.

The lower part 1 is inserted into the inverted upper part 2 as shown in FIG. 4.

The cross-sectional view of FIG. 6 shows how the now upper end 10 of the upper part 2 supports the outward projection 3 of the lower part 1.

The lower part 1 is hanging with its radial outward projection 3 provided at the lower part's upper end 9 on the edge of the upper open end 10 of the upper part 2.

The upper part 2 provides a stable support for the lower part 1, so the package an be used as a vase for relatively large bundles of flowers with little risk of falling over. The stability may be further improved by applying a cover (not shown) which during transportation can be provided on the top of the upper part 2, as a base-plate for the upper part 2 in the second, stationary position, being then the lower part.

I claim:

1. An essentially conically shaped package for flowers, candy or other consumables or objects in a first configuration and transformable into a second configuration, said package comprising:

a unitary essentially conically shaped structure formed from a single sheet with an insert part, a base part and a weakened portion along which the insert part is detachable from the base part, the base part includes a first end adjacent to the weakened portion and a second end, the insert part includes a first end adjacent to the weakened portion and a second substantially acute angled end, the first end of the insert part includes an outer diameter adjacent to the weakened portion that is larger than the inner diameter of the first end of the base part adjacent to the weakened portion, and wherein, to form the second configuration, the insert part is detached from the base part at the weakened portion, the base part is inverted and the second end of the insert part is inserted into the first end of the base part and supported by the inner diameter of the first end of the base part.

2. A package according to claim 1, wherein the insert part further comprises at least one radial outward projection and wherein, in the second configuration, the insert part at the or each radial outward projection is supported by the first end of the base part.

3. A package according to claim 1, wherein the base part further comprises at least one radial inward projection and wherein, in the second configuration, the insert part at the or each radial inward projection is supported by the first end of the base part.

4. A package according to claim 2, wherein the or each radial outward projection is provided in the form of an emboss.

5. A package according to claim 2, wherein the radial outward projection extends around the package.

6. A package according to claim 1, further comprising: the weakened portion includes a line including an oscillating pattern along which the base part is detachable from the insert part, the first end of the base part includes at least one projecting part adjacent to said line, the first end of the insert part includes at least one projecting part adjacent to said line, and wherein, in the second configuration, the projecting parts adjacent to said line of the insert part can be supported by the projecting parts adjacent to said line of the base part.

7. A package according to claim 1, which, in the first configuration, is essentially continuously tapered from top to bottom so the package can be nested into an identical second package.

8. A package according to claim 1, which, in the first configuration, is tapered along essentially straight lines from the upper end to the bottom end.

9. A package according to claim 1, wherein the second end of the base part is provided with a cover and, in the second configuration, the cover is usable as a base-plate to support the second end of the base part.

10. A package according to claim 1, wherein the lower part (1) has a water-tight bottom.

11. A package according to claim 10, wherein said blank is made of biologically degradable plastic material and welded along a line extending from the upper end to the lower end of the package.

12. An essentially conically shaped package for flowers, candy or other consumables or objects in a first configuration and transformable into a second configuration, said package comprising:

a unitary structure formed from a single sheet with an insert part, a base part, and a weakened portion along which the insert part is detachable from the base part, the unitary structure is essentially conically shaped, the base part includes a first end adjacent to the weakened portion and a second end, the insert part includes a first end adjacent to the weakened portion and a second substantially acute angled end, the base part includes at least one radial inward projection, and wherein, to form the second configuration, the base part is detached from the insert part at the weakened portion, the base part is inverted, and the second end of the insert part is inserted into the first end of the base part and is supported by the first end of the base part at the or each radial inward projection.

13. A package according to claim 12, wherein the or each radial inward projection is provided in the form of an emboss.

14. A package according to claim 12, wherein the radial inward projection extends around the package.

15. An essentially conically shaped package for flowers, candy or other consumables or objects in a first configuration and transformable into a second configuration, said package comprising:

a unitary structure formed from a single sheet with an insert part, a base part, and a weakened portion along which the insert part is detachable from the base part, the unitary structure is essentially conically shaped, the base part includes a first end adjacent to the weakened portion and a second end, the insert part includes a first end adjacent to the weakened portion and a second substantially acute angled end, the insert part includes at least one radial outward projection, and wherein, to form the second configuration, the base part is detached from the insert part at the weakened portion, the base part is inverted, and the second end of the insert part is inserted into the first end of the base part and is supported by the first end of the base part at the or each radial outward projection.

16. A package according to claim 15, wherein the or each radial outward projection is provided in the form of an emboss.

17. A package according to claim 15, wherein the radial outward projection extends around the package.

* * * * *